US008979596B2

(12) United States Patent
Lin (10) Patent No.: US 8,979,596 B2
(45) Date of Patent: Mar. 17, 2015

(54) STORAGE INTERFACE MODULE (71) Applicant: Phison Electronics Corp., Miaoli (TW)

(72) Inventor: Wei-Hung Lin, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 58 days.

(21) Appl. No.: 13/869,954

(22) Filed: Apr. 24, 2013

(65) Prior Publication Data
US 2014/0256164 A1 Sep. 11, 2014

(30) Foreign Application Priority Data
Mar. 6, 2013 (TW) .............................. 102107917 A (51) Int. Cl.
*H01R 24/00* (2011.01)
*G06K 19/077* (2006.01)

(52) U.S. Cl.
CPC .... *G06K 19/07732* (2013.01); *G06K 19/07741* (2013.01)
USPC .......................................................... 439/676

(58) Field of Classification Search
USPC .................. 439/76.1, 81, 345, 136, 630, 660; 361/737, 715
See application file for complete search history.

(56) References Cited

U.S. PATENT DOCUMENTS

| 7,440,286 | B2 * | 10/2008 | Hiew et al. | 361/737 |
|---|---|---|---|---|
| 7,575,481 | B1 * | 8/2009 | Liu | 439/660 |
| 7,632,151 | B2 * | 12/2009 | Wang et al. | 439/630 |
| 8,061,608 | B2 * | 11/2011 | Liao et al. | 235/439 |
| 8,118,607 | B2 * | 2/2012 | Zhao et al. | 439/136 |
| 8,167,658 | B1 * | 5/2012 | Liu | 439/630 |
| 8,286,879 | B2 * | 10/2012 | Chang | 235/486 |
| 2008/0096413 | A1 * | 4/2008 | Chen | 439/345 |
| 2009/0093136 | A1 * | 4/2009 | Hiew et al. | 439/55 |
| 2010/0317205 | A1 * | 12/2010 | Zhao et al. | 439/136 |

* cited by examiner

*Primary Examiner* — Alexander Gilman
(74) *Attorney, Agent, or Firm* — Jianq Chyun IP Office (57) ABSTRACT

A storage interface module including a substrate and a connecting member is provided. The substrate has a first surface, a second surface and a plurality of first openings. The first surface and the second surface are back to each other. Each of the first openings is connected through the first surface and the second surface. The connecting member is disposed on the first surface of the substrate. The connecting member has a first terminal set and a second terminal set, in which a first end of each of the terminals is connected to the first surface, and a second end of each of the terminals passes through the corresponding first opening and protrudes out of the second surface, and a third end of each of the terminals in the second terminal set is connected to the first surface.

15 Claims, 6 Drawing Sheets

STORAGE INTERFACE MODULE

CROSS-REFERENCE TO RELATED APPLICATION

This application claims the priority benefit of Taiwan application serial no. 102107917, filed on Mar. 6, 2013. The entirety of the above-mentioned patent application is hereby incorporated by reference herein and made a part of this specification.

BACKGROUND

1. Technology Field

The present invention generally relates to a storage interface module.

2. Description of Related Art

With the developments of multimedia technology, storage capacity required for digital data goes larger and larger. Conventional floppy disk in 1.44 MB features in its portable characteristic but still fails to meet the requirement of large storage capacity. Although a conventional hard disk provides a large storage capacity, it still suffers in bulk size which leads to inconvenient carrying.

Since a flash memory has the characteristics of data non-volatility, low power consumption, compact size, and non-mechanical structure, the flash memory is the most adaptable memory to be applied in a portable electronic product, in which a memory card is a storage device adopting NAND flash memory as its storage medium.

Generally speaking, a user is required to access the digital data stored in the memory card through a card reader if intending to process the digital data on a computer host. However, the data transfer between different computer hosts still remains inconvenient, as not all the computer hosts have the built-in card reader. Therefore, along with the popularization of Universal Serial Bus (USB) interface, an application of external USB card reader emerges as required. Unfortunately, such external USB card reader suffers in bulk size which also leads to inconvenient carrying.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a storage interface module with a simplified structure and a lower manufacturing cost.

The storage interface module of the present invention includes a substrate and a connecting member. The substrate has a first surface, a second surface and a plurality of first openings. The first surface and the second surface are back to each other. Each of the first openings is connected through the first surface and the second surface. The connecting member is disposed on the first surface of the substrate. The connecting member has a first terminal set and a second terminal set. In the first terminal set, a first end of each of the terminals is connected to the first surface, a second end of each of the terminals passes through the corresponding first opening and protrudes out of the second surface. In the second terminal set, a third end of each of the terminals is connected to the first surface.

According to the above descriptions, in the exemplary embodiments of the present invention, the connecting member and the substrate are assembled to form the storage interface module through the corresponding configuration of the first terminal set and the second terminal set in the connecting member, the second terminal set is then connected between the substrate and the memory card, and a portion of the first terminal set located on the first surface is allowed to protrude out of another surface of the substrate from the openings of the substrate, in order for the storage interface module and the memory card to form a storage interface module with a more compact structure. Accordingly, the memory card is capable of being assembled with the substrate through the connecting member, in order for the afore-described structure to be accommodated in the accommodating space of the housing with a simplified exterior, such that the storage interface module has a smaller volume to be carried by the user conveniently, further, the manufacturing cost can be effectively reduced due to the mass production scale of the memory card.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 1:
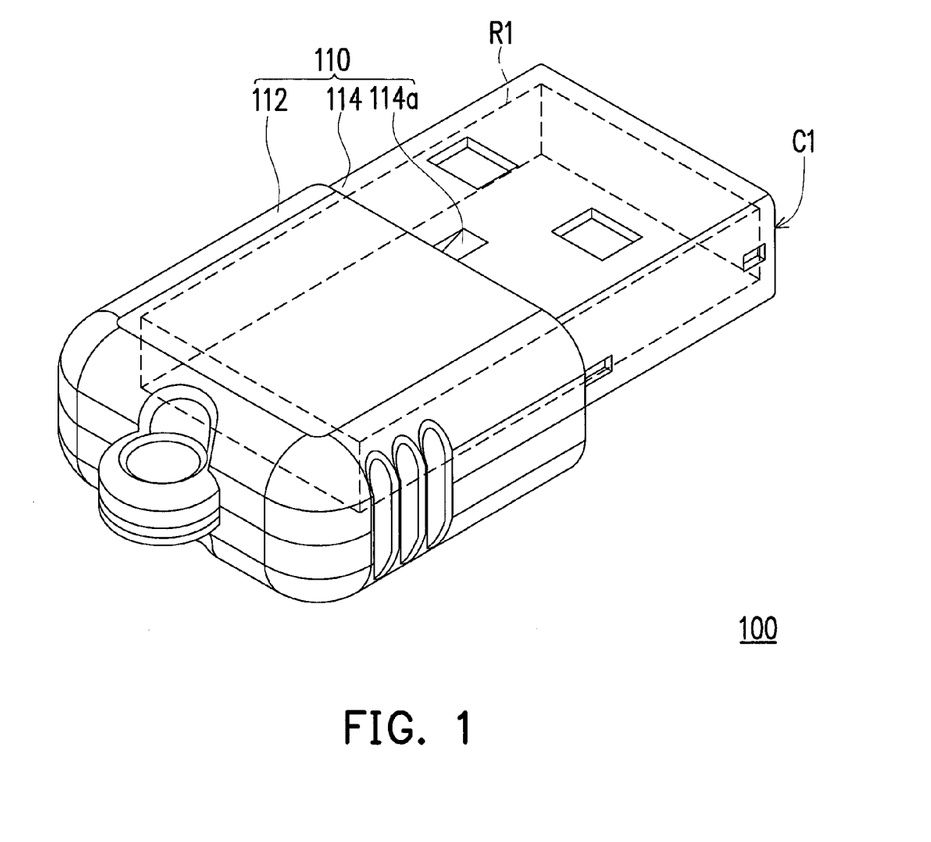
FIG. 1 is a schematic diagram illustrating a storage interface module according to an exemplary embodiment of the present invention.
Figure 2:
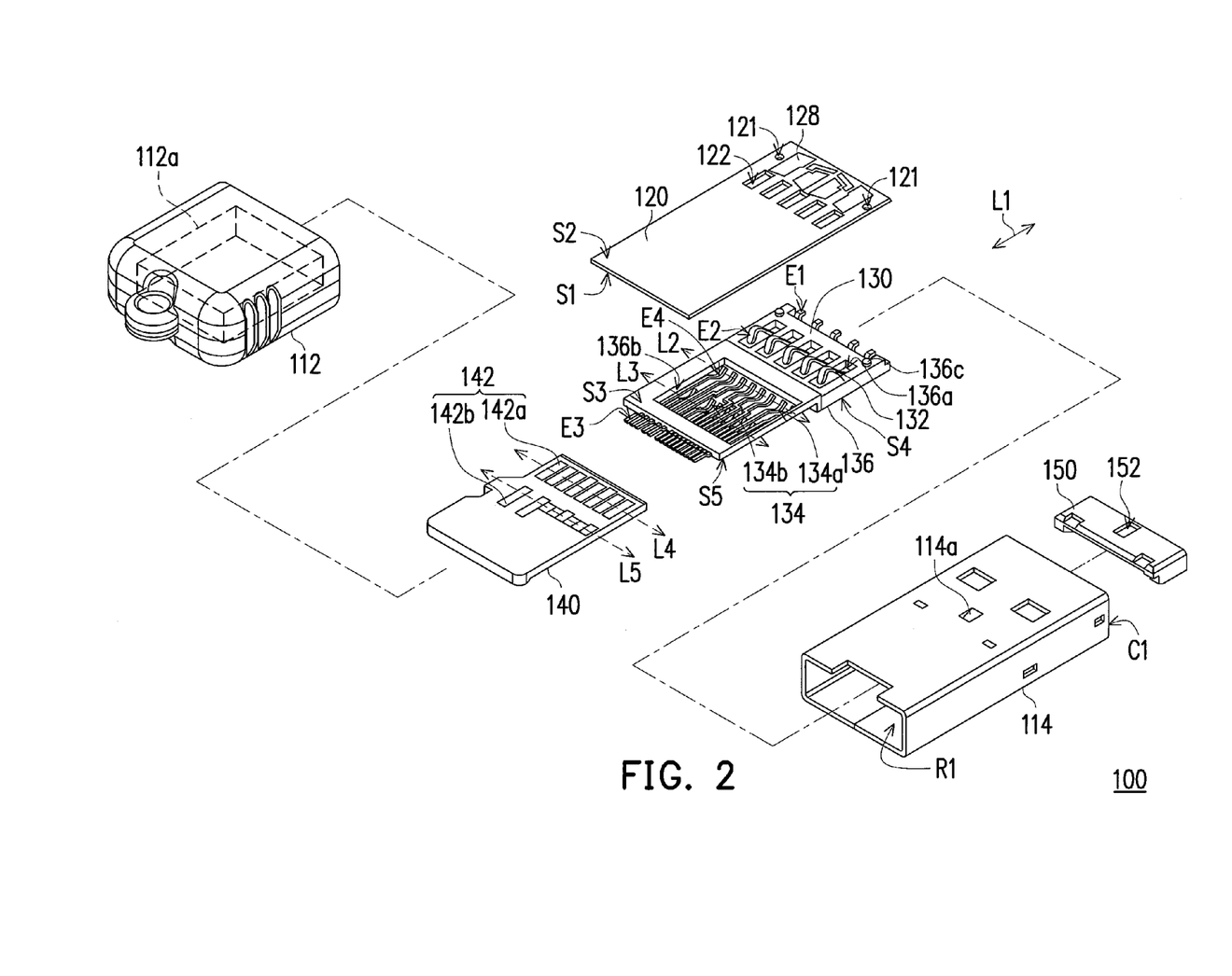
FIG. 2 is an explosion diagram illustrating the storage interface module depicted in FIG. 1.

FIG. 1 is a schematic diagram illustrating a storage interface module according to an exemplary embodiment of the present invention. FIG. 2 is an explosion diagram illustrating the storage interface module depicted in FIG. 1. Referring to FIG. 1 and FIG. 2 together, the storage interface module 100 in the exemplary embodiment can be, for instance, a flash drive that includes a housing 110, a substrate 120, a connecting member 130 and a memory card 140, in which the substrate 120 and the connecting member 130 are taken to form a connecting interface that the memory card 140 is disposed thereon. The housing 110 has an accommodating space R1 (as the dotted line shown in FIG. 1), and more specifically, the housing 110 includes a base 112 and an external interface housing 114 that are assembled together, in which the base 112 has a recess 112a, and the external interface housing 114 (such as an iron housing) is assembled into the recess 112a along an assembly axis L1, such that a side exposing the base 112 thereof forms an external port C1, which is configured to join the storage interface module 100 with other external devices (not shown).

Figure 3:
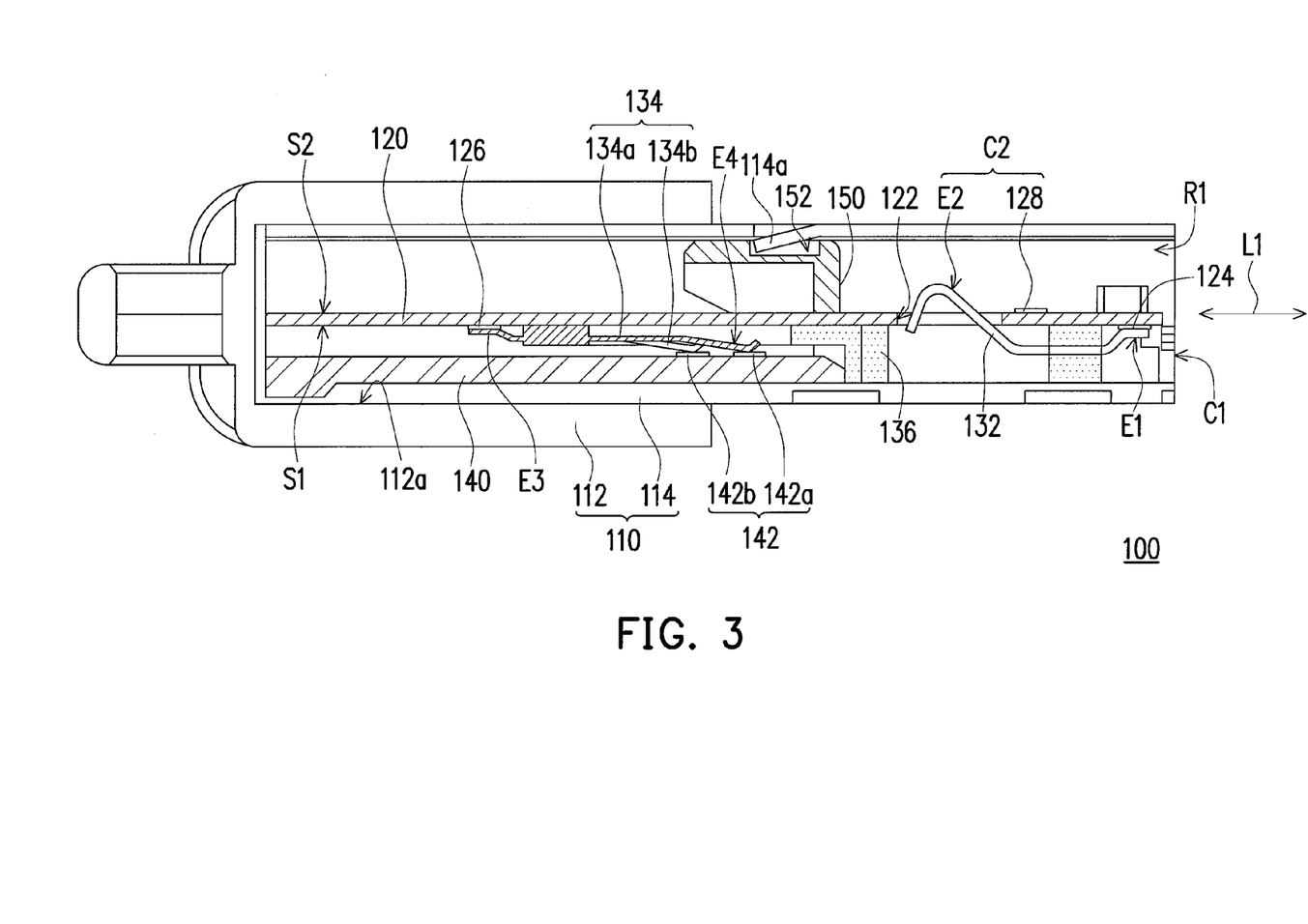
FIG. 3 is a cross-sectional diagram illustrating the storage interface module depicted in FIG. 1.

FIG. 3 is a cross-sectional diagram illustrating the storage interface module depicted in FIG. 1. Referring to FIG. 2 and FIG. 3 together, the external interface housing 114 in the exemplary embodiment has the afore-described accommodating space R1, in order for the substrate 120, the connecting member 130 and the memory card 140 to be disposed therein. The substrate 120 (such as a printed circuit board) has a first surface S1, a second surface S2 and a plurality of first openings 122, in which the first surface S1 and the second surface S2 are back to each other, and each of the first openings 122 is connected through the first surface S1 and the second surface S2.

Furthermore, the connecting member 130 is located in the accommodating space R1, and is disposed on the first surface S1 of the substrate 120. The connecting member 130 has a first terminal set 132 and a second terminal set 134. In the first terminal set 132, a first end E1 of each of the terminals is connected to the first surface S1, and a second end E2 of each of the terminals passes through the corresponding first opening 122 and protrudes out of the second surface S2. In the second terminal set 134, a third end E3 of each of the terminals is connected to the first surface S1. The memory card 140 is located in the accommodating space R1, and is disposed on a side of the connecting member 130 and back to the substrate 120, namely, the connecting member 130 is located between the substrate 120 and the memory card 140, and a fourth end E4 of each of the terminals in the second terminal set 134 is connected to the memory card 140, under the structure configuration of the exemplary embodiment.

Initially, it should be mentioned that the memory card 140 is taking the flash memory as the memory device for storing medium, such as a micro secure digital (Micro SD) memory card in the exemplary embodiment, however, it can also be a memory stick (MS), a multi media card (MMC), a compact flash card (CF), a mini secure digital (Mini SD) memory card or other suitable memory devices.

Specifically, the substrate 120 has a plurality of first pads 124 and a plurality of second pads 126 located on the first surface S1, and the memory card 140 has a plurality of third pads 142. In the first terminal set 132, the first end E1 of each of the terminals is electrically connected to the corresponding first pad 124. In the second terminal set 134, the third end E3 of each of the terminals is electrically connected to the corresponding second pad 126, and the fourth end E4 of each of the terminals is electrically connected to the corresponding third pad 142.

In this way, through correspondingly disposing the first openings 122 on the substrate 120 with the first terminal set 132 and the second terminal set 134 of the connecting member 130, and after assembling the substrate 120 and the memory card 140 via the connecting member 130, the structure shown in FIG. 3 can be formed, namely, the second terminal set 134 being connected between the memory card 140 and the substrate 120, and further, the second end E2 of the first terminal set 132 being capable of passing through the first opening 122 and protruding out of the second surface S2 of the substrate 120. Accordingly, the compact stacked structure is formed so as to further bear the memory card 140, and the negative impact causing the volume expansion due to the accumulated thickness of the elements can be avoided. In other words, through alternately stacking the afore-described elements (i.e., the substrate 120, the connecting member 130 and the memory card 140) onto each other, the volume of such structure can be effectively reduced and the structure strength can be improved, such that the volume of the storage interface module 100 can be further reduced so as to have the appearance in design of being light, thin, compact and small that is applicable to various kinds of housings, and concurrently, the manufacturing cost can be reduced due to the simplified structure.

Additionally, the substrate 120 further has a plurality of fourth pads 128 located on the second surface S2, and the fourth pads 128 and the second ends E2 of the first terminal set 132 protruded out of the second surface S2 are adjacent to the external port C1 of the external interface housing 114, and thus an external terminal set C2 of the storage interface module 100 is constituted (as shown in FIG. 3). In the exemplary embodiment, the fourth pads 128 comply with the universal serial bus 2.0 (USB 2.0) standard, and the external terminal set C2 complies with the universal serial bus 3.0 (USB 3.0) standard. In other words, through substantially extending the first pads 124 to the second surface S2 via the first terminal set 132 along the assembly axis L1, the size of the substrate 120 along the assembly axis L1 may further be effectively reduced, other than forming a universal serial bus 3.0 (USB 3.0) suitable for performing high speed data transmission on the second surface S2 of the substrate 120.

Here, the connecting method between the afore-described terminal sets and the pads is not limited, which may employ wire bonding or sealant to assemble together. For example, the memory card 140 employs the wire bonding technology to connect the connection lines (not shown) between the terminal sets and the pads, and coats the sealant on the connection lines, the pads and a portion of the terminal sets, such that the effect of the memory card 140 being non-removable and electrically connected onto the substrate 120 is finally achieved. Furthermore, the memory card 140 and the substrate 120 may also be electrically connected by using surface mounted technology (SMT), namely, welding a conductive material between the terminal sets and the pads to accomplish. Here, any means capable of assembling the memory card 140 with the substrate 120 to electrically connect the terminal sets and the pads, may all be applicable to the exemplary embodiment. Additionally, when the memory card 140 is intended to be replaced or maintained, the memory card 140 may be removed from the storage interface module 100 by decapsulating the package, such that the applicability and the durability of the storage interface module 100 may also be improved.

Similarly, in another exemplary embodiment (not shown) of the present invention, the memory card may also be assembled onto the substrate in a removable manner, thereby achieving the same improved applicability and durability effects as described above.

Figure 4:
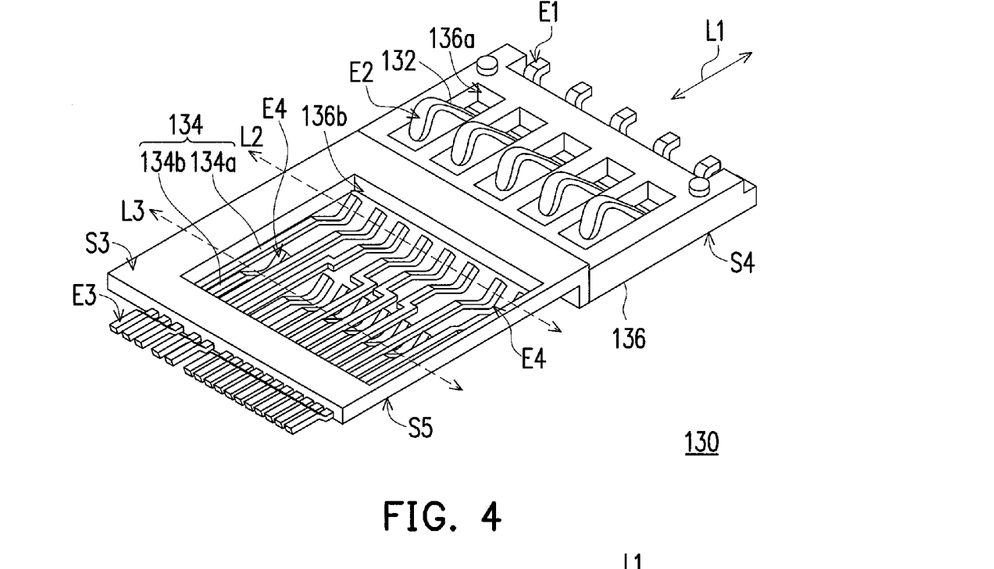
FIG. 4 and FIG. 5 are schematic diagrams illustrating the connecting member depicted in FIG. 2 respectively from different viewing angles.
Figure 5:
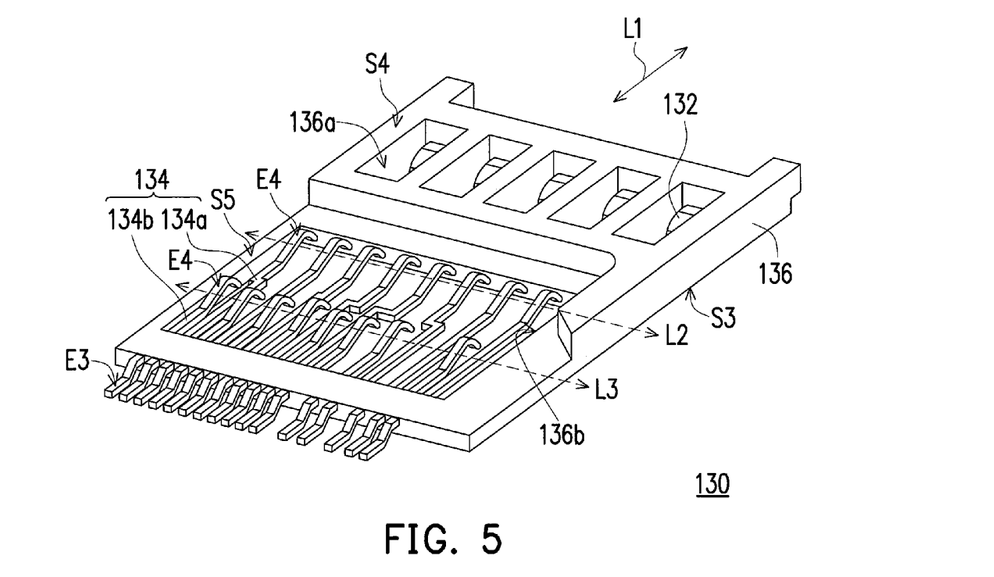

FIG. 4 and FIG. 5 are schematic diagrams illustrating the connecting member depicted in FIG. 2 respectively from different viewing angles. Referring to FIG. 4 and FIG. 5 together, the connecting member 130 in the exemplary embodiment further includes a main body 136, which is configured to embed the first terminal set 132 and the second terminal set 134 therein. The main body 136 has a third surface S3, a fourth surface S4, a fifth surface S5, a plurality of second openings 136a and a third opening 136b. The third surface S3 and the fourth surface S4 are back to each other, and each of the second openings 136a is connected through the third surface S3 and the fourth surface S4. The third surface S3 and the fifth surface S5 back to each other, and the third opening is connected through the third surface S3 and the fifth surface S5. The second end E2 of the first terminal set 132 pierces out of the third surface S3 from the second opening 136a. The fourth end E4 of the second terminal set 134 protrudes towards the fifth surface S5 from the third opening 136b.

Additionally, referring to FIG. 2, FIG. 4 and FIG. 5 again, the second terminal set 134 is divided into a plurality of first sub-terminals 134a in parallel and a plurality of second sub-terminals 134b in parallel along the assembly axis L1, in which an axis L2 of the first sub-terminals 134a and an axis L3 of the second sub-terminals 134b are parallel to each other and respectively perpendicular to the assembly axis L1. Correspondingly, in FIG. 2, the third pads 142 are divided into a plurality of first sub-pads 142a and a plurality of second sub-pads 142b, in which an axis L4 of the first sub-pads 142a and an axis L5 of the second sub-pads 142b are parallel to each other and respectively perpendicular to the assembly axis L1. The first sub-terminals 134a are electrically connected to the first sub-pads 142a, and the second sub-terminals 134b are electrically connected to the second sub-pads 142b. In other wards, the memory card 140 of the exemplary embodiment complies with the ultra high speed-II (UHS-II) interface standard of micro secure digital (Micro SD) memory card, and thus the external terminal set C2 (as shown in FIG. 3) with the same high speed transmission interface standard is collocated.

It should be noted that, the configuration of the second terminal set 134 in the connecting member 130 is not limited in the present invention, namely, the configuration relationship between the second terminal set 134 and the main body 136 is not limited herein.

Figure 6:
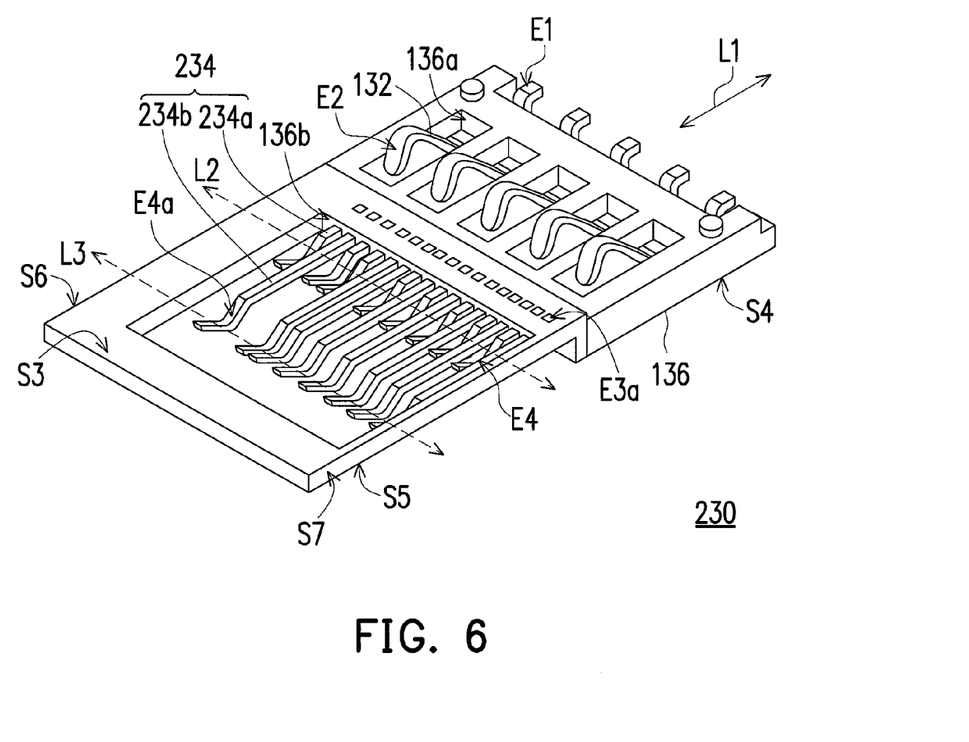
FIG. 6 is a schematic diagram illustrating a connecting member according to another exemplary embodiment of the present invention.

FIG. 6 is a schematic diagram illustrating a connecting member according to another exemplary embodiment of the present invention. Referring to FIG. 6, in the connecting member 230 of the exemplary embodiment, the first sub-terminals 234a and the second sub-terminals 234b of the second terminal set 234 are embedded in the main body 136 adjacent to the second openings 136a, namely, opposite to the embedding position of the second terminal set 134 in the afore-described exemplary embodiment, and the third ends E3a of the second terminal set 234 are exposed to the main body 136 from the third surface S3 thereof. In other words, the pads (not shown) are also correspondingly disposed on the first surface S1 of the substrate 120, so as to electrically connect with the third ends E3a. However, the fourth ends E4a of the second terminal set 234 are still remained at the same position as the fourth ends E4 in the afore-described exemplary embodiment with respect to the main body 136. In other words, since the fourth ends E4a are able to correspond to the third pads 142, the second terminal set 234 of the exemplary embodiment is still capable of being configured to electrically connect with the memory card 140 correspondingly.

Similarly, in another exemplary embodiment, the fourth ends of the second terminal set 234 may also protrude out of the main body 136 from the sixth surface S6 and the seventh surface S7.

Figure 7:
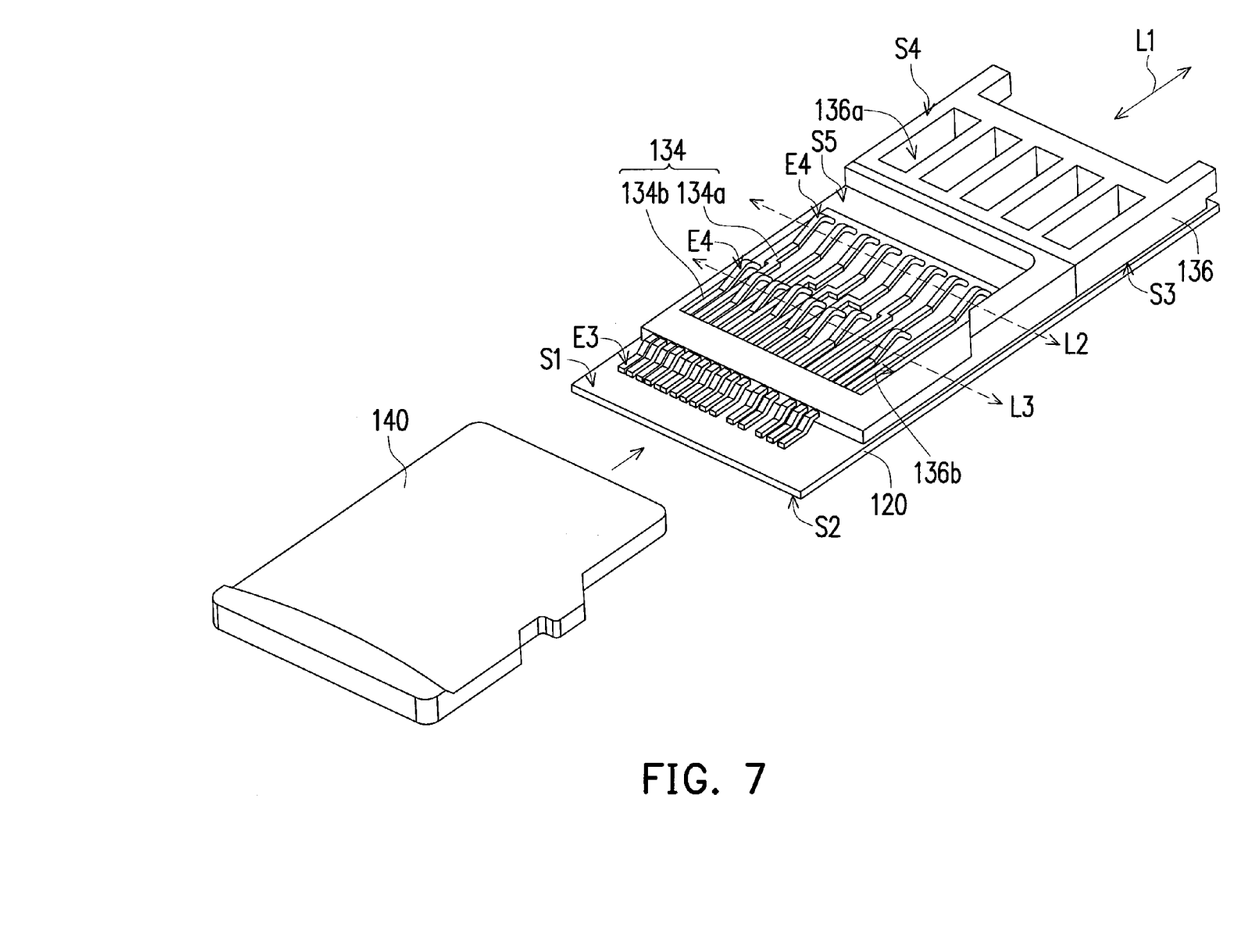
FIG. 7 is a schematic diagram illustrating parts of the assembly depicted in FIG. 2.

FIG. 7 is a schematic diagram illustrating parts of the assembly depicted in FIG. 2. Referring to FIG. 4, FIG. 5 and FIG. 7 together, in the connecting member 130 of the exemplary embodiment, the relative distance between the third surface S3 and the fourth surface S4 is greater than the relative distance between the third surface S3 and the fifth surface S5. Therefore, the main body 136 has a step structure as shown in the figure, so that the memory card 140 is supported on the fifth surface S5, and a portion of the contour of the main body 136 and a portion of the contour of the memory card 140 are complement to each other. Moreover, as shown in FIG. 2 and FIG. 4, the main body 136 of the connecting member 130 further has a positioning post 136c located on the third surface S3, and the substrate 120 further has a positioning hole 121, in which the positioning post 136c and the positioning hole 121 are aligned through guiding with each other, so that the connecting member 130 and the substrate 120 are mutually fixed.

Referring to FIG. 2 and FIG. 3 again, the storage interface module 100 in the exemplary embodiment further includes a filling member 150 that is leaned between the external interface housing 114 and the substrate 120, and is located on a side of the substrate 120 and back to the connecting member 130. The external interface housing 114 has a first assembling portion 114a such as an elastic tongue, whereas the filling member 150 has a second assembling portion 152 such as a notch, so that the elastic tongue is leaned in the notch when the assembly of the external interface housing 114 and the substrate 120 and the assembly of the connecting member and the filling member 150 are performed so as to position the afore-described elements with each other, and thus the structure strength of the storage interface module 100 is improved. Since the formation and the formation method of the filling member are not limited herein, the first assembling portion may be the notch and the second assembling portion may be the elastic tongue in another exemplary embodiment (not shown). Moreover, the filling member may be integrally formed with the main body of the connecting member, or the filling member may be integrally formed with the external interface housing, in yet another exemplary embodiment (not shown).

To sum up, in the exemplary embodiments of the present invention, through correspondingly disposing the first terminal set and the second terminal set above and below with respect to the main body and concurrently collocating with the first openings on the substrate, the connecting member allows the second ends of the first terminal set to pass through the first openings and protrude from the second surface of the substrate. As such, the substrate, the connecting member and the memory card are assembled together with the compact stacked structure and the minimum accumulated volume, thereby being accommodated in the accommodating space of the housing with the more simplified appearance. Concurrently, the storage interface module may also have a smaller bulk size that is convenient for the user to carry, other than effectively reducing the manufacturing cost through the mass production scale of the memory card. The previously described exemplary embodiments of the present invention have the advantages aforementioned, wherein the advantages aforementioned not required in all versions of the invention.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A storage interface module, comprising:
   a substrate, having a first surface, a second surface and a plurality of first openings, wherein the first surface and the second surface are back to each other, and each of the first openings is connected through the first surface and the second surface; and
   a connecting member, disposed on the first surface of the substrate and having a first terminal set and a second terminal set,
   wherein in the first terminal set, a first end of each of the terminals is connected to the first surface and a second end of each of the terminals passes through the corresponding first opening and protrudes out of the second surface, and
   wherein in the second terminal set, a third end of each of the terminals is connected to the first surface.

2. The storage interface module of claim 1, wherein the substrate further has a plurality of fourth pads located on the second surface, and an external terminal set of the storage interface module is constituted by the fourth pads and the second end of the first terminal set.

3. The storage interface module of claim 1, wherein the second terminal set is divided into a plurality of first sub-terminals and a plurality of second sub-terminals, where an axis of the first sub-terminals and an axis of the second sub-terminals are parallel to each other and maintain a distance between each other.

4. The storage interface module of claim 3, further comprising:
   a memory card, disposed on a side of the connecting member and back to the substrate,
   wherein in the second terminal set, a fourth end of each of the terminals is connected to the memory card,
   wherein the substrate has a plurality of first pads and a plurality of second pads located on the first surface, and the memory card has a plurality of third pads,
   wherein in the first terminal set, the first end of each of the terminals is electrically connected to the corresponding first pad, and
   wherein in the second terminal set, the third end of each of the terminals is electrically connected to the corresponding second pad and a fourth end of each of the terminals is electrically connected to the corresponding third pad, the third pads are divided into a plurality of first sub-pads and a plurality of second sub-pads along an assembly axis, wherein an axis of the first sub-pads and an axis of the second sub-pads are parallel to each other and respectively perpendicular to the assembly axis, the first sub-terminals are electrically connected to the first sub-pads, and the second sub-terminals are electrically connected to the second sub-pads.

5. The storage interface module of claim 2, wherein the fourth pads comply with the universal serial bus 2.0 (USB 2.0) standard, and the external terminal set complies with the universal serial bus 3.0 (USB 3.0) standard.

6. The storage interface module of claim 1, wherein the connecting member comprising:
   a main body, having a third surface, a fourth surface, a fifth surface, a plurality of second openings and a third opening, wherein the third surface and the fourth surface are back to each other, and each of the second openings is connected through the third surface and the fourth surface, the third surface and the fifth surface are back to each other, and the third opening is connected through the third surface and the fifth surface, the first terminal set is embedded in the main body and the second end pierces out of the third surface from the second opening, the second terminal set is embedded in the main body and a fourth end thereof protrudes towards the fifth surface from the third opening; and
   a positioning post, located on the third surface, wherein the substrate has a positioning hole, wherein the positioning post is wedged into the positioning hole, so that the substrate and the connecting member are mutually fixed.

7. The storage interface module of claim 6, wherein a relative distance between the third surface and the fourth surface is greater than a relative distance between the third surface and the fifth surface.

8. The storage interface module of claim 1, further comprising:
   a memory card, disposed on a side of the connecting member and back of the substrate, wherein a fourth end of each of the terminals in the second terminal set is connected to the memory card.

9. The storage interface module of claim 8, wherein the memory card complies with the micro secure digital (Micro SD) memory card interface standard.

10. The storage interface module of claim 8, wherein the memory card complies with the ultra high speed-II (UHS-II) interface standard of micro secure digital (Micro SD) memory card.

11. The storage interface module of claim 8, wherein the substrate has a plurality of first pads and a plurality of second pads located on the first surface, and the memory card has a plurality of third pads,
   wherein in the first terminal set, the first end of each of the terminals is electrically connected to the corresponding first pad, and
   wherein in the second terminal set, the third end of each of the terminals is electrically connected to the corresponding second pad, and the fourth end of each of the terminals is electrically connected to the corresponding third pad.

12. The storage interface module of claim 8, wherein the memory card is electrically connected to the substrate using surface mounted technology (SMT).

13. The storage interface module of claim 8, further comprising:
   a base, having a recess; and
   an external interface housing, assembled into the recess along an assembly axis, wherein the external interface housing has an accommodating space, so that the substrate, the connecting member and the memory card are disposed therein.

14. The storage interface module of claim 13, further comprising:
   a filling member, leaned between the external interface housing and the substrate, and located on a side of the substrate and back to the connecting member, wherein the external interface housing has a first assembling portion, and the filling member has a second assembling portion, wherein the first assembling portion is correspondingly connected to the second assembling portion.

15. The storage interface module of claim 14, wherein the first assembling portion is an elastic tongue and the second assembling portion is a notch.

* * * * *